(12) United States Patent
Scott et al.

(10) Patent No.: US 6,186,600 B1
(45) Date of Patent: Feb. 13, 2001

(54) AUTOMATIC TEST CONNECTOR ADAPTER PLATE FOR AB PIPE BRACKET

(75) Inventors: Daniel G. Scott, Pittsburgh; Lawrence J. Andrews, Cheswick, both of PA (US)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/330,109

(22) Filed: Jun. 10, 1999

(51) Int. Cl.[7] ...................................................... B06T 11/26
(52) U.S. Cl. ................................ 303/86; 303/28; 303/1; 137/884
(58) Field of Search .............................. 303/3, 1, 13, 15, 303/28, 86; 137/884

(56) References Cited

U.S. PATENT DOCUMENTS

| | | | |
|---|---|---|---|
| 5,480,218 | * | 1/1996 | Hart et al. ............................... 303/28 |
| 5,709,436 | * | 1/1998 | Scott ...................................... 303/86 |
| 5,952,566 | * | 9/1999 | Scott et al. ............................. 73/121 |
| 6,000,427 | * | 12/1999 | Hutton .................................. 137/597 |

\* cited by examiner

Primary Examiner—Robert J. Oberleitner
Assistant Examiner—Mariano Sy
(74) Attorney, Agent, or Firm—James Ray & Associates

(57) ABSTRACT

A test connector adapter plate for use with a pipe bracket portion of a freight brake control valve of a railway freight vehicle and with a portable automated single car brake tester. The pipe bracket portion having four test ports vertically disposed on a front side of such pipe bracket portion for single car brake testing. These test ports are fluidly connected to passageways within the pipe bracket for communicating fluid pressure with brake pipe, brake cylinder, emergency reservoir and auxiliary reservoir, respectively. A first member of the test connector adapter plate is engagable with the test ports on such front side of the pipe bracket portion for accessing the passageways respectively communicating to brake pipe, brake cylinder, emergency reservoir and auxiliary reservoir and are fluidly connected to respective passageways within the adapter plate. A second member of the test connector adapter plate is a manifold with access ports for providing fluid communication from brake pipe, brake cylinder, emergency reservoir and auxiliary reservoir to test receiver of the portable automated single car brake tester. The manifold of the second member of the adapter plate is directed to provide access on an axis perpendicular to that of the first member of the adapter plate so as to provide at. least one of a top and a bottom access for the portable automated single car brake tester.

5 Claims, 4 Drawing Sheets

AUTOMATIC TEST CONNECTOR ADAPTER PLATE FOR AB PIPE BRACKET

FIELD OF THE INVENTION

This invention relates, in general, to a pipe bracket portion of a brake valve control device for railway cars, such pipe bracket having a plurality of test ports for directly accessing fluid lines and determining pressures thereof and, more particularly, this invention relates to an adapter plate used with the test ports of such pipe bracket to provide at least one of a top and bottom access for the automated single car brake tester.

BACKGROUND OF THE INVENTION

Typical freight brake control valves include a pipe bracket portion having a service portion and an emergency portion mounted on opposite sides or faces of the pipe bracket. Such typical prior art brake control valve assembly is shown diagrammatically in FIG. 1. Typically, the rear side of the pipe bracket portion has a number of locations for connecting the pipe bracket portion to the piping of the freight car. These rear locations generally will include the connections to the brake pipe, the brake cylinder retaining valve, the brake cylinder, the emergency reservoir and the auxiliary reservoir.

These pipe bracket connections to the pneumatic piping permits the pipe bracket to provide the necessary communication of fluid pressures to both the service and emergency portions of the brake control valve as well as to the brake cylinder and reservoirs.

Most type AB pipe brackets only have connections to pipe lines on the rear surface. However, since it is sometimes necessary to tap into the fluid lines for the purpose of obtaining pressure measurements of the fluid within the piping, such access to the fluid is frequently quite difficult depending on the placement of the brake control valve on the freight car. In addition, the connections between the pipe bracket and the freight car piping would require them to be broken to allow monitoring of the pressures.

Recent modifications to the AB brake pipe bracket have provided direct access to the fluid passageways through the front side of the pipe bracket on the freight brake control valve. This modification eliminates the need to access the rear side of the freight brake control valve. The front side test ports provide access to the brake pipe line, the brake cylinder, the emergency reservoir and the auxiliary reservoir. Providing these test ports on the front side of the pipe bracket enables the testing of the fluid pressures within the pipe bracket without having to remove the freight brake control valve from the car or the service portion or the emergency portion from the pipe bracket portion.

Such brake pipe bracket modification has been disclosed in U.S. patent application Ser. No. 08/547,929, which is assigned to the Westinghouse Air Brake Company. The automated single car brake tester has been disclosed in U.S. patent application Ser. No. 08/396,815 and is, also, assigned to Westinghouse Air Brake Company.

The test ports on the front side of the pipe bracket provide a significant improvement over the old pipe bracket by providing access to the passageways in the pipe bracket without having to disconnect the normal fluid lines connected to the rear side of the pipe bracket portion. However, this modification only provides for a side access to the pipe bracket portion. Unfortunately, there may be instances where car builders cannot utilize the side access, which has vertically disposed test ports, and may prefer or require a top or a bottom access.

SUMMARY OF THE INVENTION

The present invention provides a test connector adapter plate engagable with vertically disposed test ports on a front side of a pipe bracket portion of a freight brake control valve of a railway freight vehicle and with a test receiver of a portable automated single car brake tester. Such pipe bracket having a plurality of passageways for providing fluid communication between such test ports on such pipe bracket portion and brake pipe, brake cylinder, emergency reservoir and auxiliary reservoir, respectively.

Such test connector adapter plate consists essentially of a first member provided with access ports which are vertically disposed and engagable with such test ports on such front side of such pipe bracket portion for accessing such passageways in such pipe bracket portion for communicating fluid pressure with brake pipe, brake cylinder, emergency reservoir and auxiliary reservoir, respectively.

Such access ports on such first member are in fluid communication with respective passageways within such test connector adapter plate for communicating fluid pressure.

A second member of such test connector adapter plate being a manifold having access ports in fluid communication via such respective passageways within such test connector adapter plate to such access ports on such first member of such test connector adapter plate for communicating fluid pressure with brake pipe, brake cylinder, emergency reservoir and auxiliary reservoir, respectfully, and engagable with such test receiver of such portable automated single car brake tester.

Such manifold of such second member of such test connector adapter plate being disposed to provide access ports on such second member on an axis perpendicular to that of such access ports on such first member of such test connector adapter plate so as to provide at least one of a top and a bottom access for such test receiver of such automated single car brake tester.

OBJECTS OF THE INVENTION

It is, therefore, one of the primary objects of the present invention to provide a test connector adapter plate for the modified AB pipe bracket which would permit a top or bottom access for use with the portable automated single car tester.

Another object of the present invention is to provide a test connector adapter plate for the modified AB pipe bracket which would not require any additional machining of the pipe bracket.

Still another object of the present invention is to provide a test connector adapter plate for the modified AB pipe bracket which is simple to install.

Yet another object of the present invention is to provide a test connector adapter plate for the modified AB pipe bracket which would include a cover plate for the top portion of the manifold access ports when a bottom access is used and a cover plate for the bottom portion of the manifold access ports when the top access is used.

In addition to the several objects and advantages of the present invention that have been discussed in some detail above, various additional objects and advantages of the automatic test connector adapter plate, according to the present invention, will become more readily apparent to those persons who are skilled in the freight brake control valve art from the following more detailed description of the invention, particularly, when such detailed description is taken in conjunction with the attached drawing Figures and with the appended claims.

BRIEF DESCRIPTION OF THE PRESENTLY PREFERRED EMBODIMENT OF THE INVENTION

Figure 1:
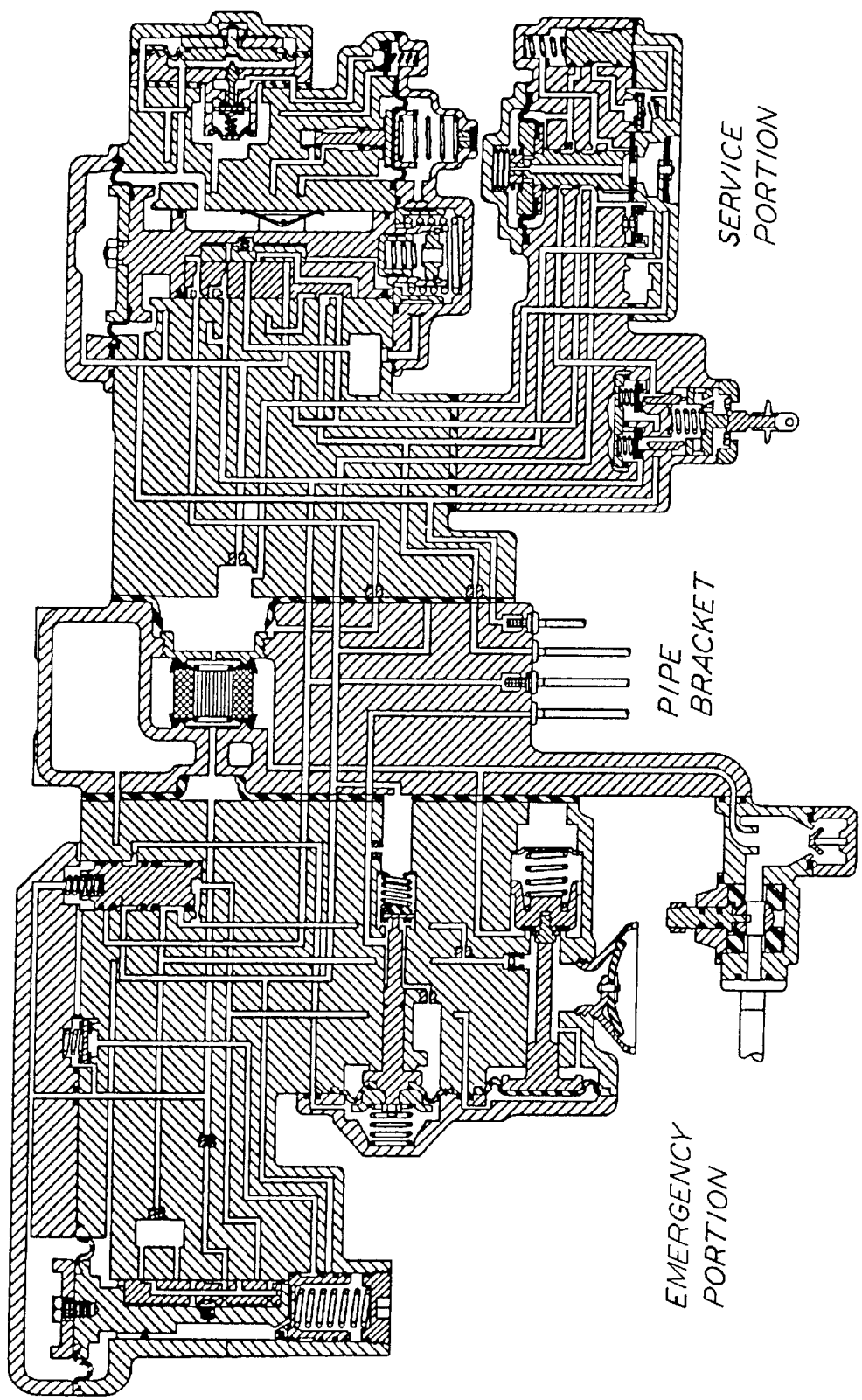
FIG. 1 is a prior art schematic of a railway freight brake control valve showing a pipe bracket portion, an emergency portion and a service portion and the passageways therein.

Prior to preceding to the more detailed description of the present invention, it should be noted that, for the sake of clarity in understanding the invention, identical components having identical functions have been designated with identical reference numerals throughout the drawing Figures.

Figure 2:
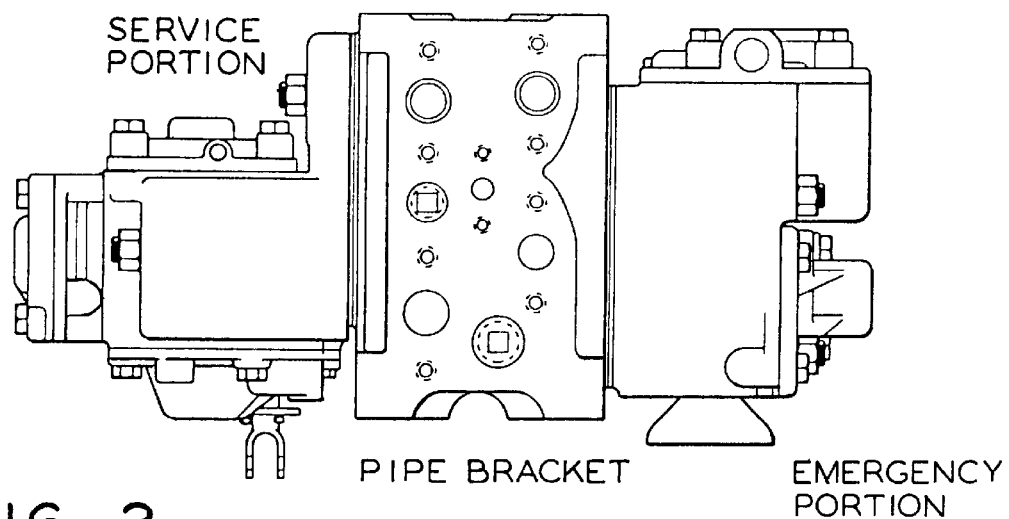
FIG. 2 is a prior art rear view of a freight brake control valve showing the pipe bracket portion interposed between the service portion and the emergency portion.

Reference is now made more particularly to the drawing FIGS. 1 and 2. Illustrated in FIG. 1 is a prior art schematic of a freight brake control valve showing the pipe bracket portion, the emergency portion, the service portion and the fluid passageways therein. FIG. 2 is a prior art rear view of a freight brake control valve showing the pipe bracket portion interposed between the service portion and the emergency portion and fittings on the rear of the pipe bracket portion for connection to the freight car piping.

Figure 3:
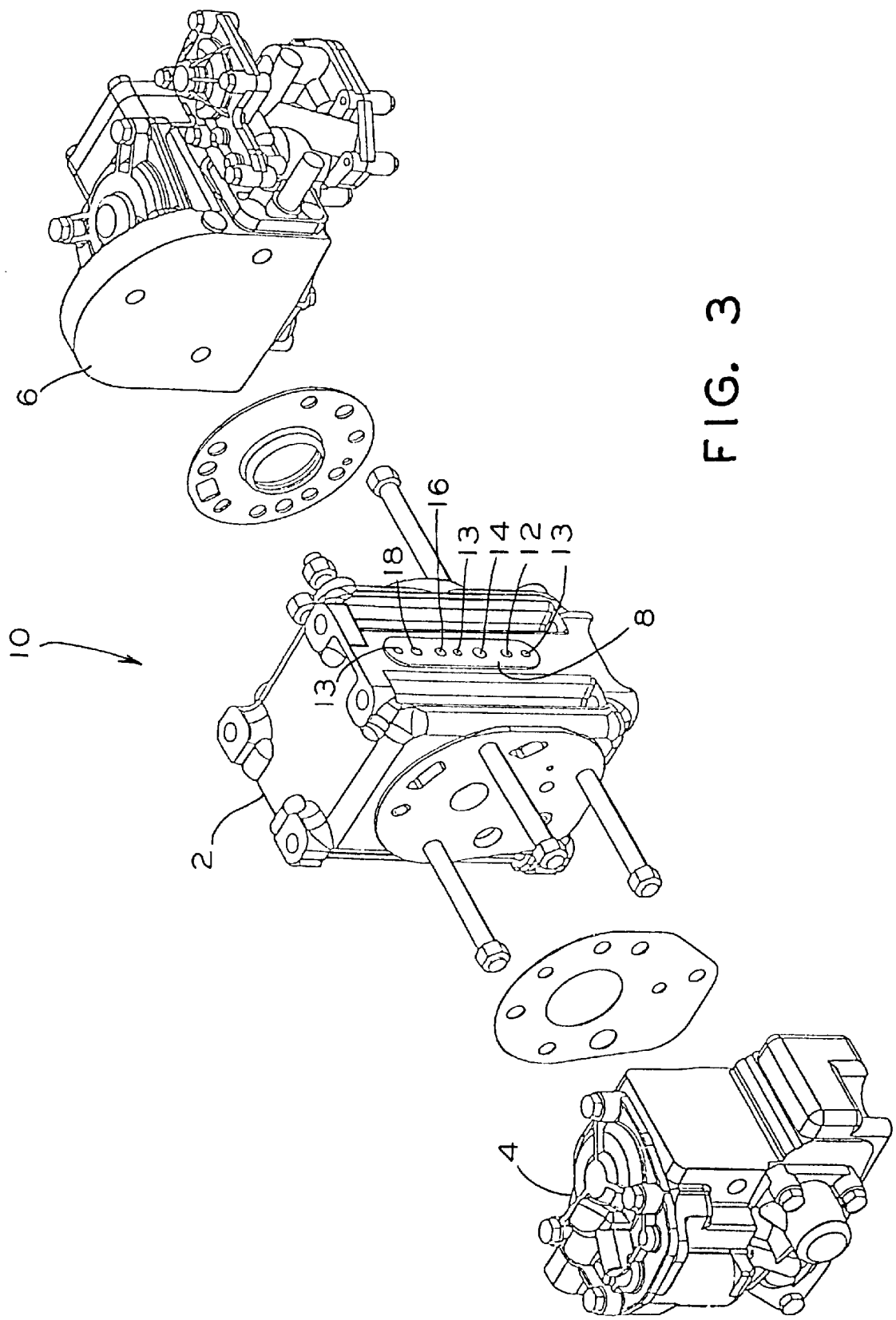
FIG. 3 is an exploded perspective view of the pipe bracket portion, the emergency portion and the service portion of a railway freight brake control valve.

FIG. 3 is an exploded view of a freight brake control valve, generally designated 10, showing a pipe bracket portion 2, interposed between the emergency portion 4 and the service portion 6. Shown in FIG. 3 are test ports 12, 14, 16 and 18 located on a mounting surface or boss 8. As is evident on FIG. 3, such test ports provide a front side access and are vertically disposed. Test port 12 provides fluid pressure communication with brake cylinder; test port 14 provides fluid communication with the brake pipe; test port 16 provides fluid pressure communication with auxiliary reservoir and test port 18 provides fluid pressure communication with the emergency reservoir. Also shown on boss 8 are threaded bolt holes 13.

Figure 4A:
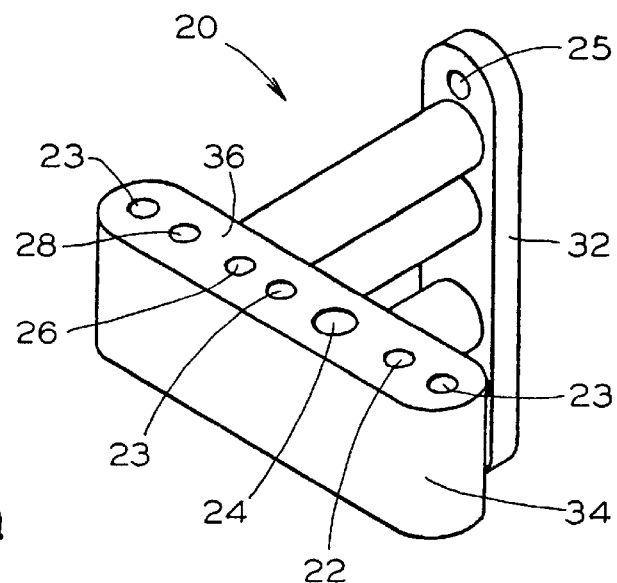
FIGS. 4a and 4b are front perspective views of an automatic test connector adapter plate showing a manifold conversion for top access and bottom access, respectively.
Figure 4B:
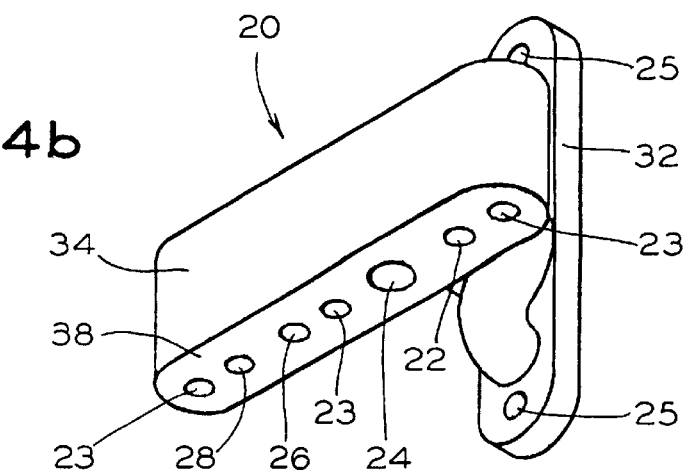

FIG. 4a is a front perspective view of the automated test connector adapter plate, generally designated 20, with first member access plate 32 mountable on boss 8 (not shown on FIG. 4a) and showing a manifold arrangement for second member 34 with top portion 36 of second member 34 available for top access. FIG. 4b is a front perspective view of the automated test connector adapter plate 20 with first member access plate 32 mountable on boss 8 (not shown on FIG. 4b) and showing a manifold arrangement for second member 34 with bottom portion 38 of second member 34 available for bottom access. Shown on the second member 34 of connector adapter plate 20 on FIGS. 4a and 4b is an access port 22 for fluid communication with test port 12 on boss 8, access port 24 for fluid communication with test port 14 on boss 8, access port 26 for fluid communication with test port 16 on boss 8, and access port 28 for fluid communication with test port 18 on boss 8.

Also shown on FIGS. 4a and 4b is first member access plate 32 which comes in contact with boss 8 shown on FIG. 3. Preferably, first member access plate 32 has a planar surface which mates with the planar surface of boss 8. When first member access plate 32 is connected to boss 8 there is fluid pressure communication between access port 22 on the second member 34 of test connector adapter plate 20 and test port 12 on boss 8 providing fluid pressure communication with brake cylinder. Similarly, there is fluid pressure communication between access port 24 on the second member 34 of test connector adapter plate 20 and test port 14 on boss 8 providing fluid pressure communication with brake pipe; there is similar fluid pressure communication between access port 26 on the second member 34 of test connector adapter plate 20 and test port 16 on boss 8 providing fluid pressure communication with auxiliary reservoir; and there is fluid pressure communication between access port 28 on such second member 34 of test connector adapter plate 20 and test port 18 on boss 8 providing fluid pressure communication with emergency reservoir. In this way test ports 22, 24, 26 and 28 on the second member 34 of test connector adapter plate 20 communicate directly to the respective passageways and to the respective lines for communicating fluid pressure with brake cylinder, brake pipe, auxiliary reservoir and emergency reservoir, respectively.

First member access plate 32 of the automated test connector adapter plate 20 may be affixed to boss 8 of such pipe bracket portion 2 of freight brake control valve 10, shown in FIG. 3, by any convenient means such as by housing screws or bolts (not shown). Holes 25 on first member access plate 32 provide openings for housing screws or bolts (not shown). Holes 23 are also provided on the second member 34 of test connector adapter plate 20 for affixing test receiver 52 of the automated single car brake tester 54 (shown in FIG. 5) and cover plate 50 (also shown in FIG. 5). Cover plate 50 is affixed to such top portion 36 or such bottom portion 38 of the manifold arrangement of second member 34 opposite the portion to which the connections from the test receiver 52 are affixed. As can be seen from FIGS. 4a and 4b test connector adapter plate 20 can be used to provide a conversion for either a top access or a bottom access for test receiver 52 of automated single car brake tester 54.

Figure 5:
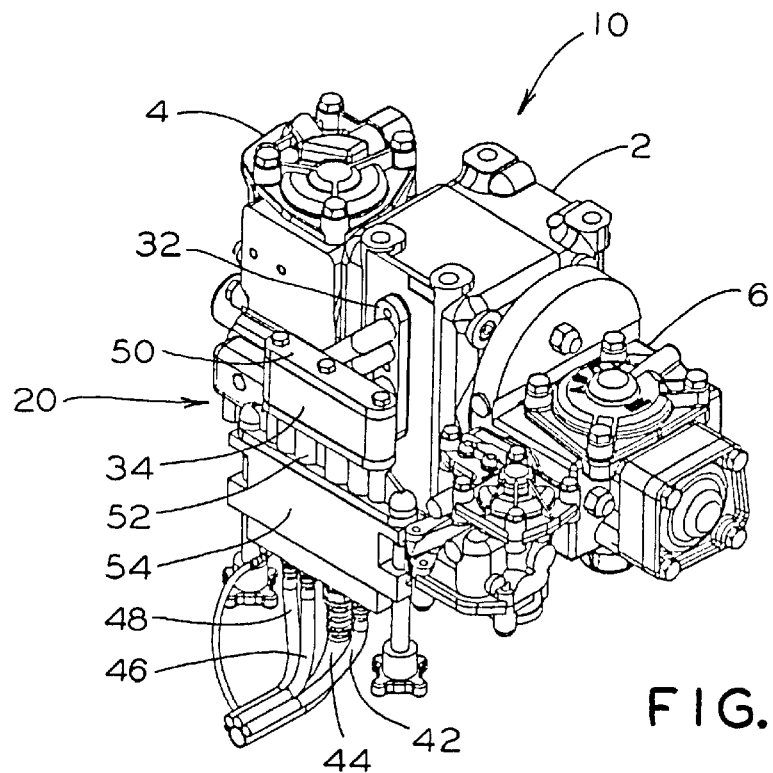
FIG. 5 is a front perspective view of a railway freight brake control valve with an automated test connector adapter plate mounted on a brake control valve providing a bottom access for the automated single car brake tester.

Reference is now made to FIG. 5 which is a front perspective view showing a brake control valve 10, with a test connector adapter plate 20, mounted on such valve 10 and positioned for bottom access. Also evident in FIG. 5 is first member access plate 32 mounted on boss (not shown) of pipe bracket 2. Test receiver 52 connects directly to the test connector adapter plate 20 and with the fluid connections for the automated single car tester 54. Fluid pressure hose 42 is in fluid communication with second member access port 22 of test connector adapter plate 20 and thus with test port 12 on boss 8 of pipe bracket 2 and ultimately with brake cylinder. Fluid pressure hose 44 is in fluid communication with second member access port 24 of test connector adapter plate 10 and thus with test port 14 on boss 8 and ultimately with brake pipe. Similarly fluid pressure hoses 46 and 48 are connected with second member access ports 26 and 28, respectively, with test ports 16 and 18, on boss 8, respectively, and with auxiliary reservoir and emergency reservoir, respectively. Fluid pressure hoses 42, 44, 46, and 48 are connected on the other end to the test module of the automated single car brake tester (not shown).

Figure 6:
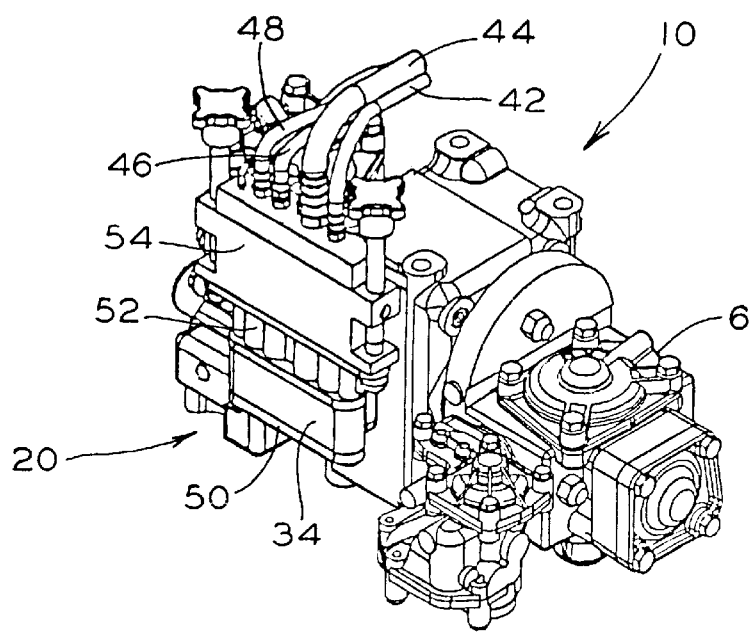
FIG. 6 is a front perspective view of a railway freight brake control valve with an automated test connector adapter plate mounted on a brake control valve providing a top access for the automated single car test brake tester.

FIG. 6 is front perspective view showing a brake control valve 10, with a test connecter adapter plate 20, mounted on such valve 10 and positioned for top access. FIG. 6 is similar to FIG. 5 except that where FIG. 5 displayed a bottom access, FIG. 6 shows a top access.

Just as in the preceding description, fluid pressure hose 42 is in fluid communication with second member access port 22 of test connector adapter plate 20 and thus with test port 12 on boss 8 of pipe bracket 2 and ultimately with brake cylinder. Fluid pressure hose 44 is in fluid communication with second member access port 24 of test connector adapter plate 10 and thus with test port 14 on boss 8 and ultimately with brake pipe. Similarly fluid pressure hoses 46 and 48 are connected with second member access ports 26 and 28, respectively, with test ports 16 and 18 on boss 8, respectively, and with auxiliary reservoir and emergency reservoir, respectively. Fluid pressure hoses 42, 44, 46, and 48 are connected on the other end to the test module of the automated single car brake tester (not shown).

Cover plate 50 is shown on test connector adapter plate 20 on the portion opposite the connections for test receiver 52. With the connections for test receiver 52 on the top of connector adapter plate 20, first member access plate 32 is hidden and thus is not visible.

The test connector adapter plate 20 thus can provide at least one of a top and bottom access for railway freight car builders who cannot utilize the vertical ports on such front side access that is presently available on the modified AB type pipe brackets. The present invention provides an option for the car builders with a minimum of expense or labor and permits them to use whichever access suits their needs.

While a presently preferred embodiment of the present invention has been described in detail above, it should be understood that various other adaptations and/or modifications of the invention can be made by those persons who are particularly skilled in the railroad art related to freight brake control valves without departing from either the spirit of the invention or the scope of the appended claims.

We claim:

1. A test connector adapter plate engagable with vertically disposed test ports on a front side of a pipe bracket portion of a freight brake control valve of a railway freight vehicle and with a test receiver of a portable automated single car brake tester, said pipe bracket portion having a plurality of passageways for providing fluid communication between said test ports and brake pipe, brake cylinder, emergency reservoir and auxiliary reservoir, respectively, said test connector adapter plate consisting essentially of:

a. a first member provided with access ports which are vertically disposed and engagable with said vertically disposed test ports on said front side of said pipe bracket portion for accessing said passageways in said pipe bracket portion for communicating fluid pressure with said brake pipe, said brake cylinder, said emergency reservoir and said auxiliary reservoir, respectively;

b. said access ports on said first member of said test connector adapter plate being in fluid connection with respective passageways within said test connector adapter plate for communicating fluid pressure;

c. a second member of said test connector adapter plate being a manifold having access ports in fluid communication via said respective passageways within said test connector adapter plate and with said access ports on said first member of said test connector adapter plate for communicating fluid pressure from said brake pipe, said brake cylinder, said emergency reservoir and said auxiliary reservoir, respectively, and engagable with said test receiver of said portable automated single car brake tester, d. said manifold of said second member of said test connector adapter plate is disposed to provide said access ports on said second member on an axis perpendicular to that of said access ports on said first member of said test connector adapter plate so as to provide at least one of a top access and a bottom access for said test receiver of said portable automated single car brake tester.

2. A test connector adapter plate, according to claim 1, wherein said manifold of said second member of said test connector adapter plate has a cover plate for said bottom access ports when said test connector adapter plate is directed for top access.

3. A test connector adapter plate, according to claim 1, wherein said manifold of said second member of said test connector adapter plate has a cover plate for said top access ports when said test connector adapter plate is directed for bottom access.

4. A test connector adapter plate, according to claim 1, wherein top portion of said manifold of said second member of said test connector adapter plate is directed for access for such portable automated single car brake tester and bottom portion of said manifold of said second member of said adapter plate is sealed to prevent loss of fluid.

5. A test connector adapter plate, according to claim 1, wherein bottom portion of said manifold of said second member of said test connector adapter plate is directed for access for such portable automated single car brake tester and top portion of said manifold of said second member of said adapter plate is sealed to prevent loss of fluid.

* * * * *